(12) United States Patent
Tsai et al.

(10) Patent No.: US 7,525,608 B2
(45) Date of Patent: Apr. 28, 2009

(54) INPUT DISPLAY AND FABRICATION METHOD THEREOF

(75) Inventors: Cheng-Yeh Tsai, Taipei County (TW); Wei-Chou Chen, Hsinchu (TW); Po-Yang Chen, Tao-Yuan Hsien (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 285 days.

(21) Appl. No.: 11/464,257

(22) Filed: Aug. 14, 2006

(65) Prior Publication Data

US 2008/0036951 A1 Feb. 14, 2008

(51) Int. Cl.
*G02F 1/136* (2006.01)

(52) U.S. Cl. .............................. 349/41; 349/42; 349/106; 349/110

(58) Field of Classification Search ................. 349/110, 349/106, 41–44
See application file for complete search history.

(56) References Cited

U.S. PATENT DOCUMENTS

| 5,483,263 | A  | * | 1/1996 | Bird et al. | 345/207 |
| 6,597,420 | B2 | * | 7/2003 | Kim et al.  | 349/106 |
| 6,833,888 | B2 | * | 12/2004 | Song et al. | 349/106 |

* cited by examiner

*Primary Examiner*—Richard H Kim
(74) *Attorney, Agent, or Firm*—Thomas, Kayden, Horstemeyer & Risley

(57) ABSTRACT

An input display and fabrication method thereof. The input display comprises a black matrix on a first substrate defining a plurality of sub-pixel areas, a plurality of color filters on the sub-pixel areas, a plurality of light sensitive elements on a second substrate facing the first substrate, a plurality of convex lenses, wherein a central axis of the convex lens is substantially aligned with the light sensitive element, and a liquid crystal layer disposed between the first substrate and the second substrate. The convex lenses converge more light on the light sensitive elements, enhancing sensitivity of the input display.

16 Claims, 3 Drawing Sheets

INPUT DISPLAY AND FABRICATION METHOD THEREOF

BACKGROUND OF THE INVENTION

1. Field of the Invention

The invention relates to input displays, and in particular to light input displays having convex lenses for converging light onto the light sensitive elements, enhancing sensitivity thereof.

2. Description of the Related Art

With an input display, a user can select from displayed options by touching the option directly. Common techniques employed in an input display for detecting the location of a touch include infrared light, surface acoustic waves, optical sensing, electromagnetic sensing, capacitance sensing and resistor sensing.

Input displays comprise a touch panel supported above a glass screen of the displays to detect touch position, increasing the cost of the display, and reducing transmittance by about 20%. Embedded optical input displays use the optical sensitivity of amorphous silicon to integrate photo thin-film transistor (photo-TFT) into array processes of thin-film transistor liquid crystal displays (TFT-LCD). Thus, the cost of embedded optical touch panel is lower and optical performance is better.

Traditional color filters of LCD comprise red, green and blue (RGB) color filters. Photo TFTs of traditional embedded optical input displays are disposed corresponding to the blue color filters, because influence of blue light on human eye and brightness of blue light are less than those of red and green light. Recently, some techniques have changed color filters from RGB to red, green, blue and white (RGBW) for enhanced resolution and brightness of small panels.

FIG. 1 is a cross section of a conventional embedded optical input displays with color filters of RGBW type. Red 140, green 160, blue 180 and white 210 color filters are surrounded by a black matrix 120. Specially, the white color filter 210 is formed by a transparent layer for keeping a uniformity of cell gap. Photo TFTs 260 are disposed on the lower substrate 300 facing the upper substrate 100 corresponding to the white color filter 210 for receiving light passing through the transparent layer. To complete an input display, the upper substrate 100 and lower substrate 300 are assembled, and a liquid crystal layer 360 is filled between the upper substrate 100 and lower substrate 300. A seal 340 is disposed between the upper and lower substrate to seal the input display. The surface curvature of the white color filter 210 is too small and a central axis 290 of the transparent layer is not aligned to photo TFT 260, limiting the light received by photo TFT, and thus diminishing the sensitivity of optical input display.

Thus, it is desirable to provide an input display which can converge more light onto photo TFTs to enhance sensitivity of the input display.

BRIEF SUMMARY OF THE INVENTION

A general object of the invention is to provide an input display with improved sensitivity. To achieve the above object, the invention provides an input display having convex lenses for receiving more light to photo TFTs.

The invention provides an input display, comprising a black matrix on a first substrate defining a plurality of sub-pixel areas, a plurality of color filters on the sub-pixel areas, a plurality of light sensitive elements on a second substrate facing the first substrate, a plurality of convex lenses, a central axis of which is substantially aligned with the light sensitive element, and a liquid crystal layer disposed between the first substrate and the second substrate.

The invention further provides a method of fabricating the input displays, comprising forming a black matrix on a first substrate defining a plurality of sub-pixel areas, forming a plurality of color filters on the sub-pixel areas, forming a plurality of light sensitive elements on a second substrate facing the first substrate, forming a plurality of openings on the first substrate corresponding to the light sensitive elements, depositing a transparent layer on the color filters, the black matrix and in the openings, etching the transparent layer into a plurality of convex lenses, a central axis of which is substantially aligned with the light sensitive element, wherein the convex lenses are converging light onto the light sensitive elements, the convex lens can be in the shape of rectangular, circle or square according to the invention, assembling the first substrate and the second substrate and disposing a liquid crystal layer between the first substrate and the second substrate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

First Embodiment

Figure 1:
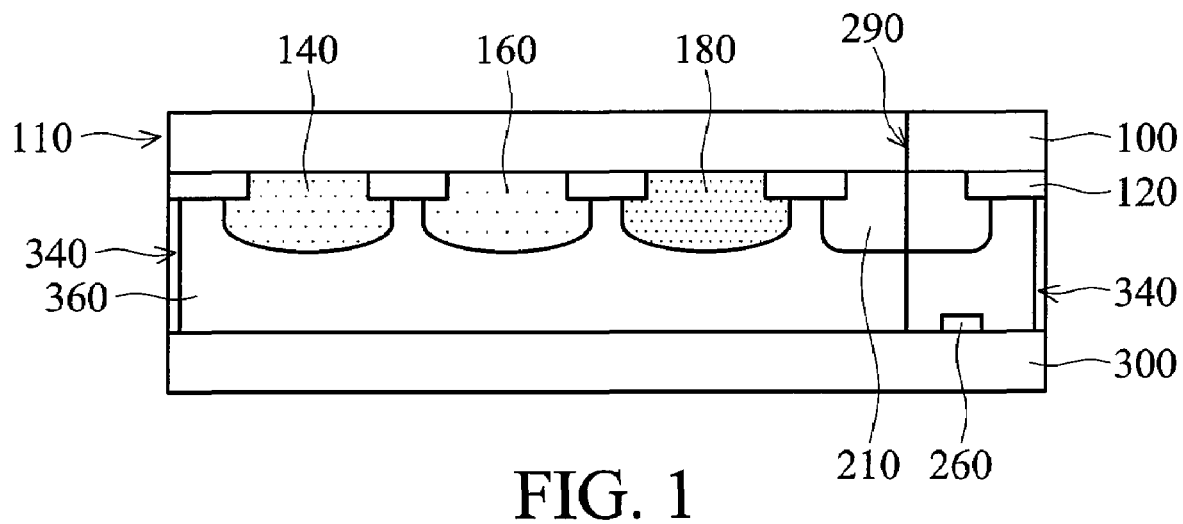
FIG. 1 is a schematic cross section of a conventional input display with color filters of RGBW.
Figure 2:
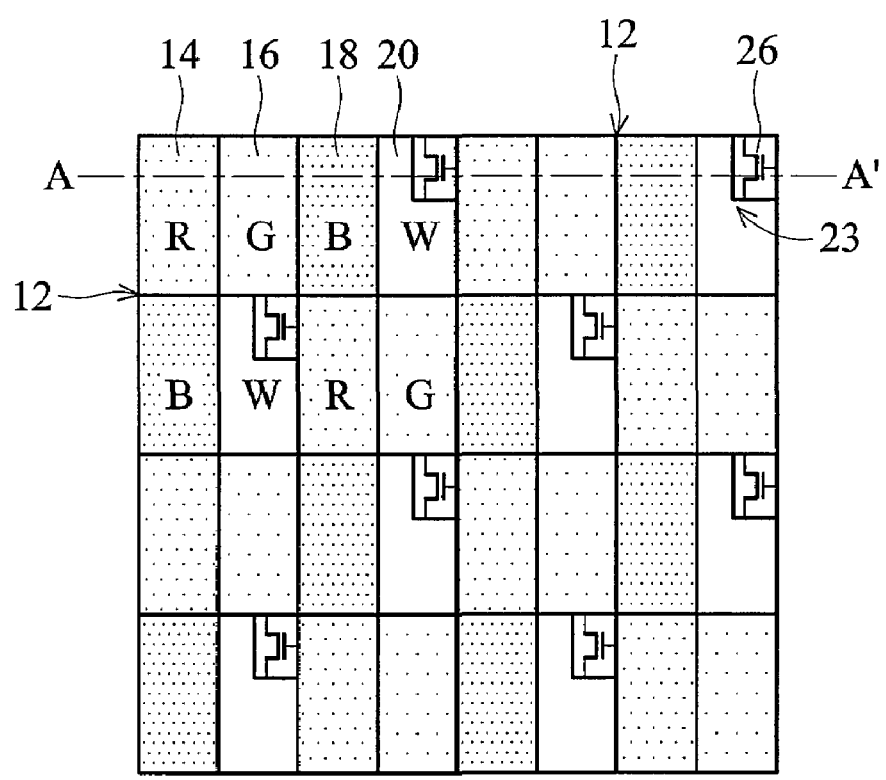
FIG. 2 is a schematic plane view of an input display with color filters of RGBW according to a first embodiment of the invention.
Figure 3:
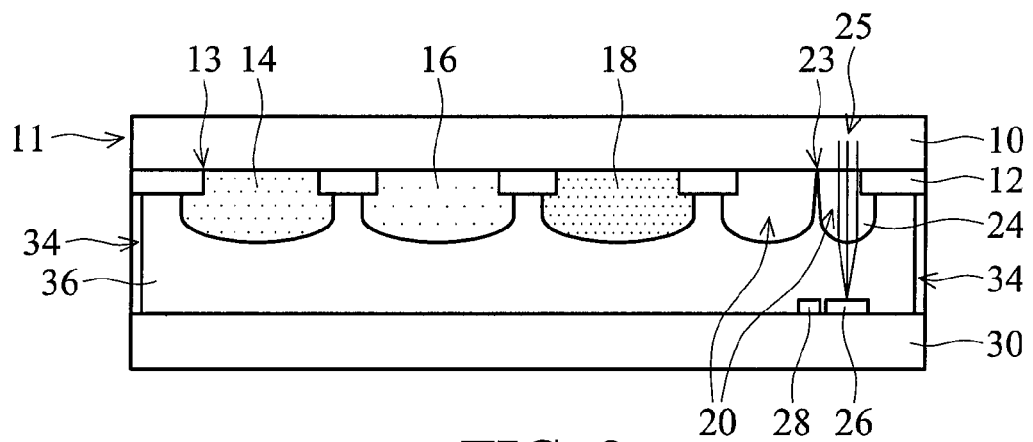
FIG. 3 is a schematic cross section of an input display with color filters of RGBW according to a first embodiment of the invention.

FIG. 2 is a plane view of an input display with color filters of RGBW type. Red 14, green 16, blue 18 and white 20 color filters are surrounded by a black matrix 12. FIG. 3 is a cross section of an input display taken along line A-A' of FIG. 2. A plurality of light sensitive elements 26 such as photo TFTs are disposed on a lower substrate 30 corresponding to positions of the white color filter 20.

The input display of the invention features a plurality of convex lenses 24 aligned to photo TFTs 26. The convex lenses can converge light 25 onto photo TFT to receive more light and increase sensitivity of the input display.

Figure 4:
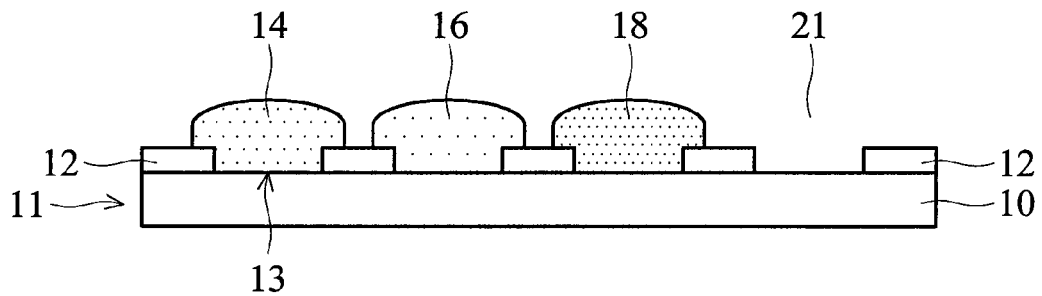
FIG. 4 is a schematic cross section of a color filter with RGB color filters and a blank sub-pixel according to a first embodiment of the invention.
Figure 5:
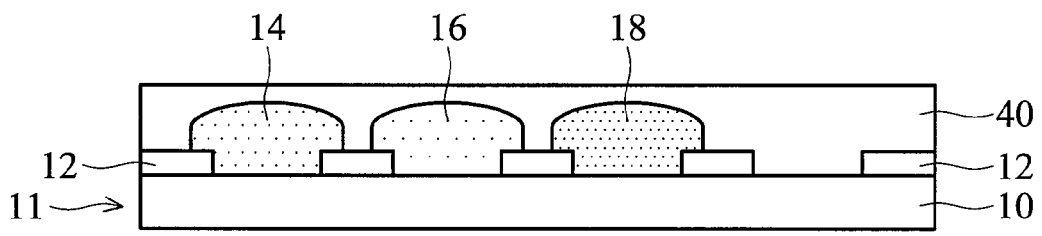
FIG. 5 is a schematic cross section of a color filter with RGBW color filters according to a first embodiment of the invention, wherein a transparent layer is deposited thereon.

The fabrication method is described in detail with reference to FIGS. 4-6. As shown in FIG. 4, a color filter 11 comprises a substrate 10 such as a plastic or glass substrate, and a black matrix 12 formed on the substrate 10 defining a plurality of sub-pixel areas 13. The color filter 11 includes red 14, green 16 and blue 18 color filters and an opening, and wherein the opening is a blank sub-pixel 21. As shown in FIG. 5, a transparent layer 40 is deposited on the red 14, green 16, and blue 18 color filters, black matrix 12 and the blank sub-pixel 21. The transparent layer 40 can be a positive photoresist or negative photoresist and is preferably a positive photoresist for forming convex lenses. Suitable transparent materials include acrylic, epoxy resin or the like.

Figure 6:
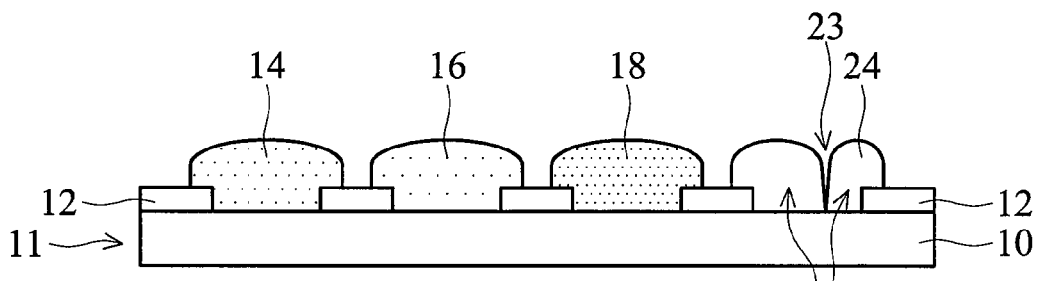
FIG. 6 is a schematic cross section of a color filter with RGBW color filters according to a first embodiment of the invention, wherein a transparent layer is patterned.

Referring to FIG. 6, the transparent layer 40 is patterned by photolithography to remove portions on the red, green and blue color filters, and black matrix, so it can uniform the cell gap in the whole display area. According to a key feature of the invention, the transparent layer in blank sub-pixel 21 is patterned to form a white color filter 20 and a groove 23 within the white color filter 20. As shown in FIGS. 2 and 3, a groove 23 is formed such that it surrounds a periphery of photo TFT 26 on the lower substrate 30 after assembly (from a top view). As such, the groove 23 defines a convex lens 24 in the white color filter 20 corresponding to the photo TFT 26. In preferred embodiments, the convex lenses 24 are substantially the same size as the photo TFTs 26 and can be in the shape of rectangular, circle or square. The convex lenses 24 may be formed by development with an alkaline aqueous solution such as NaOH, HNaCO₃ aqueous solution or the like. The convex lenses 24 are formed within the white color filter 20 on the substrate 10 and a central axis 25 of the convex lens is substantially aligned with the photo TFT 26. In preferred embodiments, the convex lenses 24 are substantially smaller than the sub-pixel areas for converging light onto the photo TFTs. Consequently, sensitivity of the input display is enhanced by the convex lenses 24.

Photo TFT 26 can be fabricated with TFT arrays (not shown) on the lower substrate 30. Because the groove 23 within the white color filter 20 will scatter light from a backlight module (not shown), a light shielding layer 28 such as metal layer is preferably provided on the lower substrate 30 corresponding to the groove 23. To complete assembly, the upper substrate 10 and lower substrate 30 are added, and a liquid crystal layer 36 is filled therebetween. A seal 34 disposed between the upper and lower substrate seals the input display.

Second Embodiment

Figure 7:
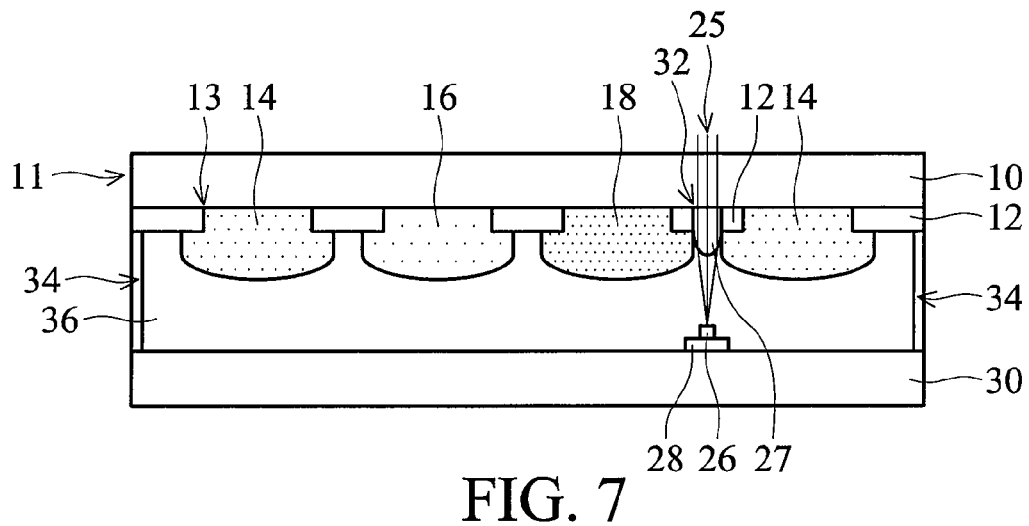
FIG. 7 is a schematic cross section of an input display with color filters of RGB according to a second embodiment of the invention.

FIG. 7 is a cross section of an input display with RGB color filters, wherein the photo TFT 26 on a lower substrate 30 is aligned with an opening 32 in the black matrix 12 on an upper substrate 10.

As shown in FIG. 7, the input display comprises the upper substrate 10 such as a plastic or glass substrate, and the black matrix 12 formed on the upper substrate 10 defining a plurality of sub-pixel areas 13. A color filter 11 includes red 14, green 16 and blue 18 color filters on the sub-pixel areas 13. A plurality of light sensitive elements 26 such as photo TFTs are disposed on the lower substrate 30 corresponding to positions of the black matrix 12 between blue 18 and red 14 color filters.

Figure 8:
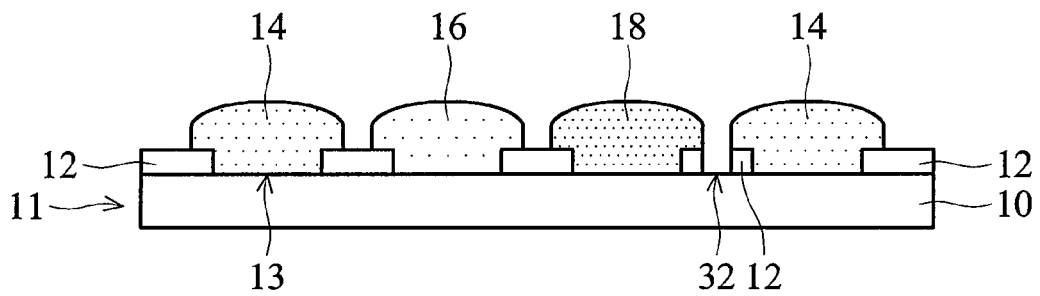
FIG. 8 is a schematic cross section of a color filter with RGB color filters according to a second embodiment of the invention, wherein a plurality of openings are in a black matrix.
Figure 9:
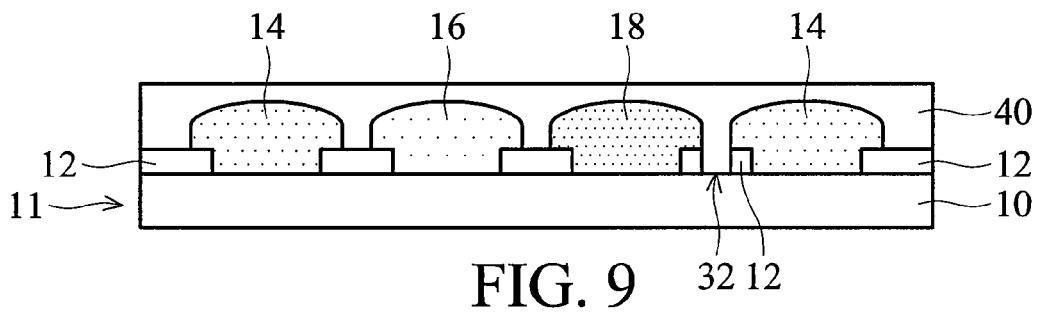
FIG. 9 is a schematic cross section of a color filter with RGB color filters according to a second embodiment of the invention, wherein a transparent layer is deposited thereon.

The fabrication method is described in detail with reference to FIGS. 8-10. As shown in FIG. 8, the black matrix 12 between red 14 and blue 18 color filters is developed or etched to form a plurality of openings 32 corresponding to the positions of photo TFTs after assembly (not shown). As shown in FIG. 9, a transparent layer 40 is deposited on the red 14, green 16 and blue 18 color filters, black matrix 12 and in the openings 32. The transparent layer can be a positive photoresist or negative photoresist and is preferably a positive photoresist for forming convex lenses. Suitable transparent materials include acrylic, epoxy resin or the like.

Figure 10:
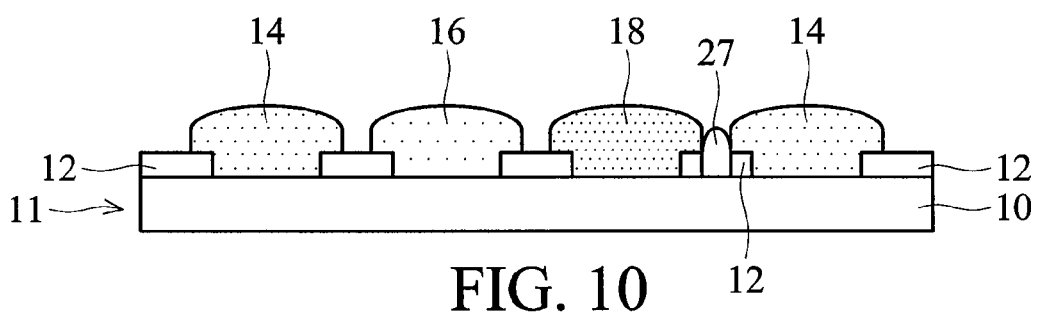
FIG. 10 is a schematic cross section of a color filter with RGB color filters according to a second embodiment of the invention, wherein a transparent layer is patterned.

Referring to FIG. 10, the transparent layer 40 is patterned by photolithography to remove portions on the red, green and blue color filters, and black matrix. The transparent layer in the opening 32 is simultaneously etched to form a convex lens 27. In preferred embodiments, the convex lens 27 is substantially the same size as the photo TFTs 26. The convex lens 27 may be formed by development with an alkaline aqueous solution such as NaOH, HNaCO₃ aqueous solution or the like. The convex lenses 27 are formed in the opening 32 on the upper substrate 10 and a central axis 25 of the convex lens is substantially aligned to the photo TFT 26 and can be in the shape of rectangular, circle or square. In preferred embodiments, the convex lenses 27 are substantially smaller than the sub-pixel areas for converging lights to the photo TFTs 26. Therefore, sensitivity of the input display is enhanced by the convex lenses 27.

Photo TFT 26 can be fabricated with TFT arrays (not shown) on lower substrate 30. Because the opening 32 in the black matrix 12 cannot shield light from a backlight module (not shown), a light shielding layer 28 such as metal layer is preferably provided on the lower substrate 30 corresponding to the opening 23. To complete assembly, the upper substrate 10 and lower substrate 30 are added, and a liquid crystal layer 36 is filled therebetween. A seal 34 disposed between the upper and lower substrate seals the input display.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An input display, comprising:
   a first substrate;
   a black matrix on the first substrate defining a plurality of sub-pixel areas;

a plurality of color filters on the sub-pixel areas;
a second substrate facing the first substrate;
a plurality of light sensitive elements on the second substrate;
a plurality of convex lenses on the first substrate, wherein a central axis of the convex lens is substantially aligned with the light sensitive element; and
a liquid crystal layer disposed between the first substrate and the second substrate.

2. The input display as claimed in claim 1, wherein the convex lenses are substantially smaller than the sub-pixel areas on the first substrate, converging light onto the light sensitive elements.

3. The input display as claimed in claim 2, further comprising a light shielding layer on the second substrate corresponding to at least partly of the convex lens.

4. The input display as claimed in claim 3, wherein the convex lenses are substantially the same size as the light sensitive elements.

5. The input display as claimed in claim 4, wherein the light sensitive elements are thin film transistors.

6. The input display as claimed in claim 1, wherein the convex lens is formed of positive photoresist or negative photoresist.

7. The input display as claimed in claim 1, wherein the color filters comprise red, green, blue and white (RGBW) color filter.

8. The input display as claimed in claim 7, wherein the light sensitive elements correspond to positions of the white color filter on the first substrate.

9. The input display as claimed in claim 8, wherein the convex lenses are within the white color filter corresponding to the light sensitive elements.

10. The input display as claimed in claim 9, further comprising a light shielding layer on the second substrate corresponding to a periphery of the convex lenses.

11. The input display as claimed in claim 1, wherein the color filters comprise red, green and blue (RGB) color filters.

12. The input display as claimed in claim 11, wherein the light sensitive elements correspond to positions of the black matrix on the first substrate.

13. The input display as claimed in claim 12, further comprising a plurality of openings in the black matrix corresponding to the light sensitive elements.

14. The input display as claimed in claim 13, wherein the convex lenses are disposed in the openings.

15. The input display as claimed in claim 14, further comprising a light shielding layer on the second substrate corresponding to the openings.

16. The input display as claimed in claim 1, wherein the convex lenses comprise acrylic or epoxy resin.

* * * * *